Dec. 31, 1957 ARTHUR W. LO 2,818,555

MAGNETIC CONTROL SYSTEMS

Filed July 27, 1955 2 Sheets-Sheet 1

INVENTOR.
ARTHUR W. LO
BY Morris Rabkin
ATTORNEY.

INVENTOR.
ARTHUR W. LO
BY Morris Rabkin
ATTORNEY

United States Patent Office 2,818,555

Patented Dec. 31, 1957

2,818,555

MAGNETIC CONTROL SYSTEMS

Arthur W. Lo, Elizabeth, N. J., assignor to Radio Corporation of America, a corporation of Delaware Application July 27, 1955, Serial No. 524,664

12 Claims. (Cl. 340—174)

This invention relates to magnetic systems, and particularly to systems useful in controlling or switching electric signals.

In a copending application entitled "Magnetic Systems," Serial No. 455,725, filed by Jan A. Raichman and the present inventor on September 13, 1954, there is described a "transfluxor." A transfluxor is useful, for example, in the control and switching of electric signals. Briefly, a transfluxor includes a body of magnetic material having a rectangular hysteresis loop and having a plurality of flux paths provided therein. A selected one of the flux paths has at least two portions each, respectively, in common with two other non-selected flux paths. By applying suitable excitation currents to windings linked to non-selected paths, the two common portions of the selected path can be set to the same or to opposite states of saturation.

An A. C. (alternating current) signal is applied to a signal winding linking the selected path. When the two common portions are in the same state of saturation, an output signal is induced in an output winding linking the selected path. When the two common portions are in opposite states of saturation, no signal is induced in the output winding. Thus, the transfluxor can be considered to have two magnetic response conditions, namely, "unblocked" and "blocked" response conditions. The transfluxor "remembers" the response condition to which it is set for an indefinitely long period of time. No holding power is required.

It is an object of the present invention to enhance the usefulness of magnetic control systems and switching networks by providing an improved transfluxor.

Still another object of the present invention is to provide an improved magnetic control system which can be set by signals of either polarity.

A further object of the present invention is to provide an improved and inexpensive magnetic system for switching electric signals.

The above and further objects of the present invention are carried out by providing, in magnetic material having a rectangular hysteresis loop, a plurality of apertures including a pair of setting apertures, an output aperture, and a preferably central blocking aperture in the magnetic material. A flux path is selected about the output aperture. A setting winding links the material about each of the pair of setting apertures; a blocking winding links the material about the blocking aperture; and an input and an output winding, respectively, link the material about the output aperture. By applying a signal to the blocking winding, two portions of the material in the path about the output aperture are placed in opposie states of saturation. Thereafter, A. C. signals applied to the input winding do not induce signals in the output winding.

This transfluxor can be placed in an unblocked condition by applying a pulse of either polarity to the setting winding, thereby bringing all portions of the path about the output aperture to saturation in the same state. Thereafter, signals applied to the input winding induce corresponding signals in the output winding.

The features of this invention, as well as the invention itself, both as to its organization and method of operation, will best be understood from the following description, when read in connection with the accompanying drawings, wherein like reference numerals refer to like parts, and in which.

Figure 1:
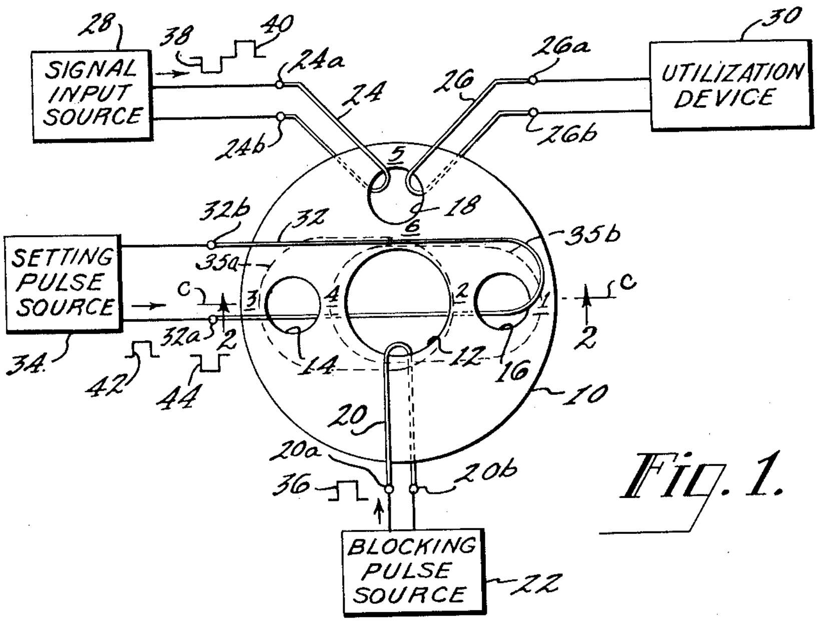
Fig. 1 is a schematic diagram of a magnetic system according to the invention employing a transfluxor having a pair of setting apertures.
Figure 4:
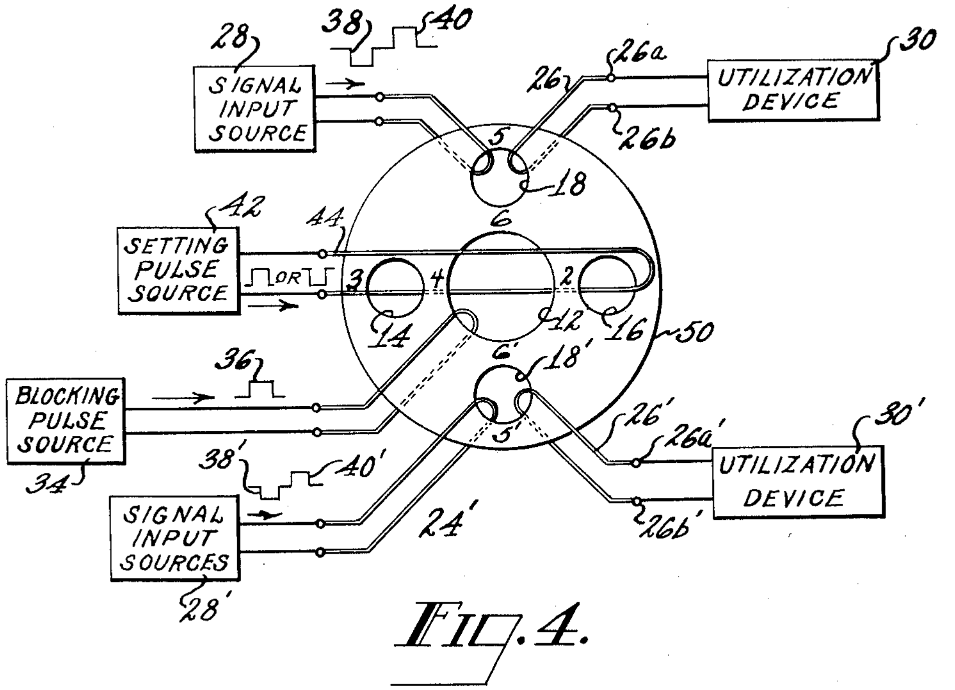
Figure 5:
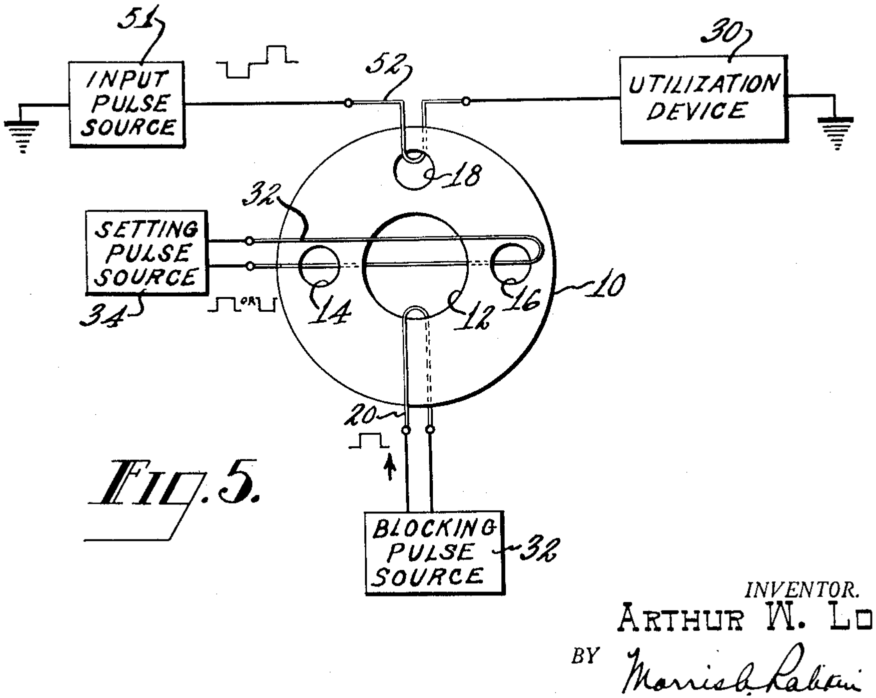

Figs. *3a*, *3b* and *3c* are diagrams useful in explaining the operation of the transfluxor of Fig. 1;

Fig. 4 is a schematic diagram of a magnetic system according to the invention employing a transfluxor having a pair of setting apertures and a plurality of output apertures, and Fig. 5 is a schematic diagram of a magnetic system according to the invention employing the transfluxor of Fig. 1 as a variable impedance element.

Referring to Fig. 1, a transfluxor 10 is made from a magnetic material having a rectangular hysteresis loop. The material is in the form of an annular core in which the central aperture 12 is the blocking aperture. A pair of setting apertures 14, 16 are symmetrically located in the material and have their respective centers located along a center line *c—c* of the transfluxor 10. This center line is horizontal in the view of Fig. 1. An output aperture 18 has its center along a vertical center line of the transfluxor 10. The diameter of the blocking aperture 12 is made larger than that of the output aperture 18 and each of the setting apertures 14 and 16, respectively, for reasons described hereinafter. The setting and the blocking apertures are bounded at the center line *c—c* by the legs 3 and 4 about the setting aperture 14 by legs 2 and 1 about the setting aperture 16, and by legs 4 and 2 about the blocking aperture 12. The output aperture 18 is bounded at a vertical center line by legs 5 and 6.

The cross-sectional areas of the legs 1 through 6, taken through their most restricted portions which lie along center lines of the transfluxor 10, are equal. Each even-numbered leg includes the material between the inside surface of the blocking aperture 12 and the inside surface of one of the smaller apertures along a center line; and each odd-numbered leg includes the material between the periphery of the transfluxor 10 and the inside wall of one of the smaller apertures.

Figure 2:
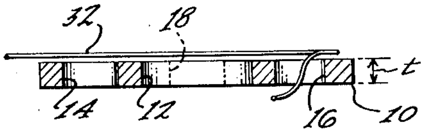
Fig. 2 is a cross-sectional view along the line 2—2 of the transfluxor of Fig. 1.

A cross-sectional view of the transfluxor 10 taken along the center line *c—c* is shown in Fig. 2. The thickness "*t*" of the transfluxor 10 may be uniform throughout. Suitable magnetic materials each having a substantially rectangular hysteresis loop include, for example, certain manganese-magnesium ferrites.

A blocking winding 20 is wound through the blocking aperture 12 by threading the blocking winding 20, beginning with the terminal **20*a*, across the top (exposed) surface of the transfluxor 10, as viewed in Fig. 1, then downwardly through the blocking aperture 12, and then along the bottom surface of the transfluxor 10 to the terminal 20*b*. The terminals of the blocking winding 20 are connected to a blocking pulse source 22. A signal input winding 24 and an output winding 26 are respectively wound through the output aperture 18 in a manner similar to the blocking winding 20, beginning with their respective terminals 24*a* and 26*a*. The terminals of the signal input winding 24 are connected to a signal input source 28. The terminals of the output winding 26 are connected to a utilization device 30. A setting winding 32 is wound through the first and second setting apertures 14 and 16 of the pair of setting apertures. For example, as shown, beginning with one terminal 32***a*, the setting winding 32 is passed across the top surface of the transfluxor 10, then is brought downwardly through the first setting aperture 14, then passed across the bottom surface of the transfluxor 10, then brought upwardly through the second setting aperture 16, and then passed across the top surface of the transfluxor 10 to the other terminal 32*b*. The terminals of the setting winding 32 are connected to a setting pulse source 34. The various windings are shown herein as single-turn windings for convenience of drawing. When desired, multi-turn windings may be employed.

Each of the sources herein are preferably constant-current sources such as pentode-type vacuum tube circuits. The blocking pulse source is arranged to furnish a pulse of one polarity, for example positive-out of the source at terminal 20*a*, to the blocking winding 20. The direction of current flow (conventional) in a winding is indicated by the arrow adjacent thereto. The setting pulse source 34 is arranged to furnish pulses of either positive or negative polarity to the setting winding 32. The signal input source 28 is arranged to furnish pairs of pulses; one pulse of the pair is of one polarity and the other pulse of a pair is of the opposite polarity. The utilization device 30 may be any device responsive to signals induced across the terminals of the output winding 26, or it may be a simple load.

The operation of the system of Fig. 1 will be explained in connection with the diagrams of Figs. 3*a*, 3*b* and 3*c*. There is an individual flux path about each of the apertures. In addition to these individual flux paths, there exist two other longer flux paths 35*a* and 35*b* which are presently of interest; each longer path includes only the blocking aperture 12 and a single one of the setting apertures 14 and 16, respectively. One longer path 35*a* lies along the legs 2, 6 and 3 about the blocking aperture 12 and the first setting aperture 14; the longer path 35*b* lies along the legs 4, 6 and 1 about the blocking aperture 12 and the second setting aperture 16.

The usual conventions regarding the senses of flux flow around a closed path, and the corresponding states of saturation of the magnetic material, that were adopted in the above-mentioned copending application are retained herein. Briefly, there are two senses of flux flow around a closed path. A positive current flow (conventional) through a surface bounded by the path produces a flux in the clockwise direction, as viewed by an observer facing in the direction of current flow, around the path linked by the current. One state of saturation, with reference to a closed path, is that in which the saturating flux is oriented in one sense around the path; and the other state of saturation, with reference to that path, is that in which the saturating flux is oriented in the other sense around the closed path.

One manner of operating the system of Fig. 1 is as follows: Assume that the blocking pulse source 22 is operated to cause a positive current pulse 36 to flow in the blocking winding 20. The amplitude of this positive current is made sufficient to establish a clockwise flux throughout each of the legs 1–6, with reference to the blocking aperture 12. The flux orientation in the respective legs, upon the termination of the current pulse 36, is indicated by the solid arrows of the diagram of Fig. 3*a*. Note that, with respect to the individual paths about each of the smaller apertures, the flux in the adjacent legs is oriented in opposite senses about each aperture. Each of the windings linked by any changing flux has a voltage induced across its terminals. The windings can be considered to be open-circuited when the blocking pulse is applied and no current flow is produced by any induced voltage.

Assume, now, that the signal input source 28 is operated to apply a pair of pulses, comprising a negative pulse 38 and a positive pulse 40, to the signal input winding 24. Neither one of the pair of input pulses produces a flux change in the path about the output aperture 18, because the one or the other of the legs 5 or 6 is already saturated with flux oriented in the direction of the magnetizing force generated by the one or the other of the pair of pulses 38 and 40. Accordingly, this pair of signal input pulses does not induce any voltage across the terminals of the output winding 26 because no flux change is produced in the path about the output aperture 18.

In this condition, the transfluxor 10 remains in the blocked condition for an indefinitely long sequence of input pulses. In practical magnetic materials, the hysteresis loop does deviate by some small amount from the ideal rectangular shape assumed herein. Therefore, some small flux change is produced in the path about the output aperture 18 by the input pulses, and some small voltage is induced across the terminals of the output winding 26. Various known compensation schemes can be used to cancel this small unwanted voltage. However, for most practical purposes, presently available materials have hysteresis characteristics such that the unwanted output voltage is but a small fraction of the desired voltage produced when the transfluxor is in an unblocked condition. Thus, the unwanted voltage may be considered a "noise" voltage and may be readily discriminated against in most applications.

The transfluxor 10 can be placed in an unblocked condition by operating the setting pulse source 34 to apply a setting current pulse to the setting winding 32. The setting pulse may be of either polarity. For example, assume that the positive setting pulse 42 is applied to the setting winding 32. This pulse of current produces a flux change in the legs 1, 6 and 4 about the blocking aperture 12 and the first setting aperture 16. The new flux orientation in these legs resulting from the positive setting pulse 42 is indicated in Fig. 3*b* by the dotted arrows. The blocking pulse source may be open-circuited when a setting pulse is applied. Thus, no current flow is produced in the blocking winding 20 by a setting pulse.

No flux change is produced in the legs 3 and 2 by the positive setting pulse because the direction of magnetizing forces acting on the paths about the first and second setting apertures 14 and 16 are each in a direction to maintain the flux orientation in the legs 3 and 2 in the clockwise and counter-clockwise senses, respectively, with respect to the adjacent first and second setting apertures 14 and 16. The flux in the legs 5 and 6 now is oriented in the same clockwise sense, with reference to the output aperture 18, and the transfluxor 10 is unblocked.

The minimum ampere turns required for a setting pulse can be approximated by using standard equations, or can be readily determined by trial and error. In practice, however, determination of the required minimum magnetizing force is not critical, because a setting pulse may be practically unlimited in amplitude. In short, the setting pulse need only be made of sufficiently great amplitude to operate the device properly.

When the pair of pulses are applied to the signal input winding 24 by the signal-input source 28, the first negative pulse 38 reverses the flux in the path about the output aperture 18 from the clockwise to the counter-clockwise sense; and the following positive pulse changes the flux back to the initial clockwise sense. An indefinite number of pairs of input pulses can be applied. Each pulse of the pair produces a flux reversal in the path about the output aperture 18. Each time a flux change in produced by an input signal, a voltage is induced across the terminals of the output winding 26. The time interval between the pulses of the pair of input pulses effectively may be any value in excess of some minimum value required for producing a flux change in the path about the output aperture 18. The amplitudes of the input pulses may be the same or may be different. With different amplitude pulses, the smaller amplitude pulse is preferably the negative pulse. Most of the power transfer to the utilization device then is produced by the larger amplitude, positive pulse. The negative pulse performs the functions of a priming pulse. Substantially, this mode of operation of a transfluxor is described in the aforementioned copending application as the asymmetrical mode.

The amplitude of the negative pulse is limited to some maximum value due to the possibility of changing the transfluxor 10 from the blocked to the unblocked response condition by an input pulse. This maximum amplitude is equal to a value which produces a magnetizing force in a longer path about both the output aperture 18 the blocking aperture 12, including the legs 5, 2 and 4. For example, referring to Fig. 3*a*, if the negative pulse 38 exceeded this maximum amplitude, the flux in the legs 5, 4 and 2 can be reversed from the clockwise to the counter-clockwise sense with reference to the blocking aperture 12. The legs 5 and 6 would then have flux oriented in the same counter-clockwise sense, with reference to the output aperture 18, corresponding to the unblocked response condition. The following positive input pulse 40 and each succeeding input pulse would then produce a flux change in the path about the aperture 18.

The amplitude of the positive input pulse 40, however, may be indefinitely large because, in the blocked response condition, all the legs except leg 6 have flux oriented in the clockwise direction with reference to the output aperture 18. Accordingly, the positive pulse can not operate to change the transfluxor 10 from a blocked to an unblocked response condition.

Figure 3A:
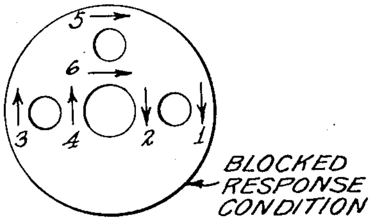
Figure 3B:
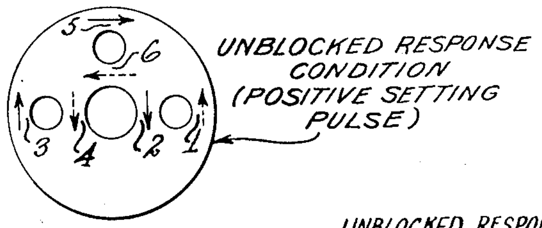
Figure 3C:
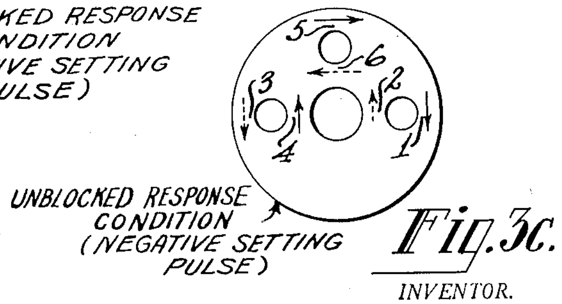

A new, positive blocking pulse 36 applied to the blocking winding 20 again places the transfluxor 10 in a blocked response condition with flux oriented in a clockwise sense, with reference to the blocking aperture 12, in all the legs 1—6, as indicated in Fig. 3*a*.

Assume, now, that a negative setting pulse 44 is applied to the setting winding 32 by the setting pulse source 34. This negative setting pulse produces a flux change in that longer path 35*a* about the first setting aperture 14 and the blocking aperture 12 along the legs 3, 2 and 6. The flux orientation in the legs 3, 2 and 6, upon the termination of the negative setting pulse 44, is indicated in Fig. 3*c* by the respective dotted arrows in these legs. Note that the flux orientation in the legs 5 and 6 about the output aperture 18 is again in the same clockwise sense about that aperture, and the transfluxor 10 is again placed in its unblocked response condition. The maximum flux change produced by the negative setting pulse 44 is limited in this case by the cross-sectional area of the outer leg 3. The cross-sectional areas of the legs 3 and 6 are made equal to insure that no flux change is produced in the leg 5 by the negative setting pulse. The cross-sectional area of the inner leg 2 may be greater than that of the leg 3.

The minimum amplitude of the negative setting pulse 44 is also made equal to, or greater than, the minimum value required to produce a flux change throughout the narrowest portion of the leg 6. When the setting apertures are symmetrically located with respect to the blocking and output apertures, the minimum amplitudes for the positive and negative setting pulses would be the same. When the setting apertures are located at different distances from the blocking aperture 12, however, the minimum amplitudes required vary approximately proportional to the radial distances of the setting apertures and the inside surface of the output aperture 18. Note the similarity in operation when a negative blocking pulse is applied from pulse source 22. This operation will be clear to those skilled in the art from the foregoing.

A copending application, Serial No. 473,709, entitled "Magnetic Systems," filed by Jan. A. Rajchman on December 7, 1954, describes a transfluxor system which operates as an analogue device. That is, the transfluxor has a continuous range of response conditions between two extremes. One extreme is that in which there is no flux change produced in the path about the output aperture 18 by a setting signal, and the other extreme is that in which a flux change is produced in substantially all portions of the leg 6 by a setting signal. The transfluxor of the present invention may also be operated in an analogue fashion by suitably regulating the amplitudes of the setting pulses. The output signals then vary proportionally to the amplitude of the setting pulse previously applied.

A transfluxor according to the present invention may be used for controlling a plurality of signal input sources by providing a plurality of output apertures. Thus, referring to Fig. 4, the transfluxor 50 is provided with two similar output apertures 18 and 18′. The two output apertures 18 and 18′ may be located symmetrically with respect to a horizontal centerline, one on each side thereof, and each centered on the vertical center line. The legs 5′ and 6′ adjacent the second output aperture 18′ may have cross-sectional areas respectively equal to those of the legs 5 and 6 adjacent the first aperture 18. In other respects the transfluxor 50 of Fig. 4 may be the same as the transfluxor 10 of Fig. 1.

A second signal input winding 24′ and a second output winding 26′ are wound through the second output aperture 18′. The transfluxor 50 may be used for controlling the coupling of signals furnished by the first and second signal input sources 28 and 28′ to the first and second utilization devices 30 and 30′, respectively. The input signals from the two different sources may be applied simultaneously, each causing a flux change in the path about one of the output apertures 18 when the transfluxor 50 is in an unblocked condition. Other signal input sources may be controlled in like fashion. The signals from the different input sources may be applied at different times from each other.

The two response conditions, characterized herein as the blocked and the unblocked conditions, are related to the arrangements wherein both the input and the output windings are coupled to the same flux path. A transfluxor, however, may be used as a different variable impedance device wherein the input winding linking the selected flux path is connected serially to the load device. In this case of the serial connection, the previously characterized response conditions are reversed. That is, when the portions of the selected flux path are in opposite states, a large signal is developed across the series-connected load because substantially none of the input signal energy is absorbed by the transfluxor. The transfluxor then resembles a low impedance load and, with respect to the load device, the transfluxor is unblocked. When the portions of the selected flux path are in the same state, substantially no signal is developed across the load device because most of the signal input energy is absorbed by the flux reversal produced in the selected path. The transfluxor then resembles a high impedance device and, with respect to the load device, the transfluxor is blocked.

Fig. 5 is one arrangement for operating a transfluxor 10, according to the invention, as a variable impedance device. In this case, the input pulse source 51 connected to one terminal of the input winding 52 is preferably a constant voltage source. The amount of voltage applied to the utilization device 30, connected to the other terminal of the input winding 52, is controlled by the setting source pulses applied to the setting winding 32. The utilization device 30 can also be coupled to the transfluxor 10 in various ways as described, for example, in connection with Figs. 16 through 21 of the aforementioned Rajchman application Serial No. 473,709. In such case, the input pulse source is preferably a constant-current source connected to the parallel arrangement of the transfluxor 10 and the utilization device 30.

There have been described herein improved magnetic systems for controlling or switching electric signals by means of transfluxors. Bipolarity setting pulses can be employed by providing the transfluxors with a pair of setting apertures. The flexibility in setting the transfluxor to a desired response condition is advantageous in system operations. In certain systems it is necessary to provide additional pulse inverter circuits to change the activating pulse from one polarity to the other. The system of the present invention obviates the requirement for providing such additional inverter circuits. If desired, unilateral conducting device can be connected in series in the output winding 26 in order to prevent one polarity of current from flowing in the output winding 26.

What is claimed is:

1. A magnetic device comprising a body of substantially rectangular hysteresis loop magnetic material having a plurality of apertures therein and an individual flux path about each of said apertures, one of said paths being a selected path, and at least two other longer flux paths each about a different pair of said apertures and each including the same one portion of said selected path, a first winding means wound through a first of said apertures for magnetizing said one portion of said selected path in one sense and at least another portion of said selected path in the sense opposite the one sense, a second winding means wound through a second and a third of said apertures, said second winding means being adapted to produce a flux change along the one or the other of said longer paths when correspondingly energized by the one or the other polarity excitation for reversing the magnetization of said one portion of said selected path, and an output winding linking said selected path and serving as an output for the device.

2. A magnetic device comprising a body of substantially rectangular hysteresis loop magnetizable material providing a closed loop, said body having at least four different apertures therein, a first winding wound through a first of said apertures for producing a magnetic flux completely around said loop in one sense, and winding means wound through a second and a third of said apertures each adjacent said first aperture so that, when said winding means is energized by an excitation of either polarity, the magnetizing force generated thereby will produce a flux change from said one sense to the sense opposite the one sense in at least a portion of the material adjacent a fourth of said apertures.

3. A magnetic device comprising an annularly shaped core of substantially rectangular hysteresis loop magnetizable material having a plurality of apertures therein including a central aperture, a first means including a winding wound through said central aperture for producing a magnetic flux completely around the core in one sense, said core having at least a first, a second and a third aperture each through a portion of the material between the inner and outer radial dimensions thereof, said third aperture being located between said first and second apertures around said central aperture, and a first winding wound through said first and second apertures so that, when energized by a pulse of either polarity, the magnetizing force generated thereby will produce a flux change from said one sense to the sense opposite the one sense in at least a portion of the material adjacent said third aperture.

4. A magnetic device comprising a body of substantially rectangular hysteresis loop magnetizable material providing a closed loop and having at least four different apertures therein, a first means including a first winding wound through a first one of said apertures for producing a magnetic flux completely around said loop in one sense, a second, a third and a fourth of said apertures being located adjacent said first aperture and said fourth aperture being located between said second and third apertures, winding means wound through said second and said third apertures exclusively so that, when energized by a pulse of either polarity, the magnetizing force generated thereby will produce a flux change from said one sense to the sense opposite the one sense in at least a portion of the material adjacent said fourth aperture, and second winding means wound through said fourth aperture for applying magnetizing forces to the material about said fourth aperture.

5. A magnetic device comprising a body of substantially rectangular hysteresis loop magnetizable material providing a closed loop and having a plurality of apertures therein, a first means for producing a magnetic flux completely around said loop in one sense, a first winding wound through a first and a second of said apertures exclusively so that, when energized by a pulse of either polarity, the magnetizing force generated thereby produces a flux change from said one sense to the sense opposite the one sense in at least a portion of the material adjacent a third of said apertures, and separate second and third winding means each wound through said third aperture, whereby excitations applied to said second winding means induce signal in said third winding means only when a flux change is caused in said portion of material adjacent said third aperture by energizing said first winding.

6. A magnetic device comprising an annularly shaped core of substantially rectangular hysteresis loop magnetizable material having a plurality of apertures therein including a central aperture and at least second, third and fourth apertures each through a portion of the core between the inner and outer radial dimensions thereof, the diameter of said central aperture being substantially larger than the diameter of any one of said second, third and fourth apertures, a first means for producing a magnetic flux completely around the core in one sense, and a winding wound through said second and third apertures so that, when energized by a pulse of either polarity, the magnetizing force generated thereby will produce a flux change from said one sense to the sense opposite the one sense in at least a portion of the material adjacent said fourth aperture.

7. A magnetic device comprising an annularly shaped core of substantially rectangular hysteresis loop magnetizable material having a plurality of apertures therein including a central aperture and at least second, third and fourth apertures each through a portion of the core between the inner and outer radial dimensions thereof, said second, third and fourth apertures being so located in said core that the cross-sectional area at the most restricted part of said core between the periphery of said core and the inside surface of said second and third apertures, respectively, is substantially equal to the cross-sectional area at the most restricted portion of said core between the inside surfaces of said central and said fourth apertures.

8. A magnetic device comprising a unitary core of magnetic material characterized by having a substantially rectangular hysteresis loop, said core having a plurality of apertures therein, means for producing a magnetic flux completely around said core in one sense, and a winding wound through a first and a second of said apertures exclusively so that, when energized by a pulse of either polarity, the magnetizing force generated thereby will produce a flux change from said one sense to the sense opposite the one sense in at least a portion of said core adjacent a third of said apertures.

9. A magnetic device comprising a unitary core of substantially rectanguar hysteresis loop magnetic material having a plurality of apertures therein, means for producing a magnetic flux completely around said core in one sense, a first winding wound through a pair of said apertures so that, when energized by a pulse of either polarity, the magnetizing force generated thereby produces a flux reversal to the opposite sense in portions of said core adjacent the remaining ones of said plurality of apertures, and a plurality of other windings, separate ones of said other windings being wound through different ones of said remaining apertures.

10. A magnetic device comprising an annularly shaped core of substantially rectangular hysteresis loop magnetizable material having a central aperture and a plurality of other apertures, each of said plurality of other apertures extending through a portion of the core between the inner and outer radial dimensions thereof, a first winding wound through said central aperture for producing a magnetic flux completely around said core in one sense, a second winding wound through a first and a second of said plurality of other apertures exclusively so that, when energized by an excitation of either polarity, the magnetizing force generated thereby produces a flux reversal in the portions of said core located between said central aperture and respective ones of the remaining ones of said plurality of other apertures, and a plurality of third windings, separate ones of said third windings being wound through separate ones of said remaining apertures.

11. A magnetic device comprising a body of substantially rectangular hysteresis loop magnetizable material providing a closed loop and having a plurality of apertures therein, a first means for producing a magnetic flux in the material adjacent each said aperture in one sense, with reference to one of said apertures, a first winding wound through a first and a second of said apertures exclusively, said first winding, when energized by a pulse of either polarity, generating a magnetizing force to produce a flux change from said one sense to the sense opposite the one sense in at least a portion of the material adjacent a third of said apertures, and separate second and third winding means each wound through said third aperture, excitations applied to said second winding means producing signals in said third winding means only when said flux change is caused in said portion of material adjacent said third aperture as a result of energizing said first winding.

12. A magnetic device comprising a unitary core of magnetic material characterized by having a substantially rectangular hysteresis loop, said core having a plurality of apertures therein, means for producing a magnetic flux in the material adjacent each said aperture in one sense, with reference to one of said apertures, and a winding wound through a first and a second of said apertures exclusively so that, when energized by a pulse of either polarity, the magnetizing force generated thereby will produce a flux change from said one sense to the sense opposite the one sense in at least a portion of said core material adjacent a third of said apertures.

References Cited in the file of this patent

UNITED STATES PATENTS 2,519,425 Grant ---------------- Aug. 22, 1950

U. S. DEPARTMENT OF COMMERCE

PATENT OFFICE

CERTIFICATE OF CORRECTION

Patent No. 2,818,555 Arthur W. Lo December 31, 1957

It is hereby certified that error appears in the printed specification of the above numbered patent requiring correction and that the said Letters Patent should read as corrected below.

Column 10, the list of references cited should appear as shown below instead of as in the patent —

2,519,425 Barlow - -Aug. 22, 1950

2,519,426 Grant - - Aug. 22, 1950

Signed and sealed this 10th day of June 1958.

(SEAL)

Attest:

KARL H. AXLINE

Attesting Officer

ROBERT C. WATSON

Commissioner of Patents